E. B. AYRES AND T. H. RHOADS.
DRIER.
APPLICATION FILED JULY 1, 1921.

1,423,298.

Patented July 18, 1922.
2 SHEETS—SHEET 2.

Inventors-
Elwood B. Ayres,
Thomas H. Rhoads.
by their Attorneys.
Howson & Howson

UNITED STATES PATENT OFFICE.

ELWOOD B. AYRES AND THOMAS H. RHOADS, OF PHILADELPHIA, PENNSYLVANIA, ASSIGNORS TO PROCTOR & SCHWARTZ, INCORPORATED, OF PHILADELPHIA, PENNSYLVANIA, A CORPORATION OF PENNSYLVANIA.

DRIER.

1,423,298.

Specification of Letters Patent.   Patented July 18, 1922.

Application filed July 1, 1921. Serial No. 481,793.

*To all whom it may concern:*

Be it known that we, ELWOOD B. AYRES and THOMAS H. RHOADS, citizens of the United States, residing in Philadelphia, Pennsylvania, have invented certain Improvements in Driers, of which the following is a specification.

One object of our invention is to improve the construction of machines for drying skins so as to utilize the entire floor space occupied by the machine with drying chambers.

A further object of our invention is to drive the conveyers, which receive the heated air direct from the fans, at a greater speed than the conveyer in the chambers through which the air is returned to the fans.

Figure 1:
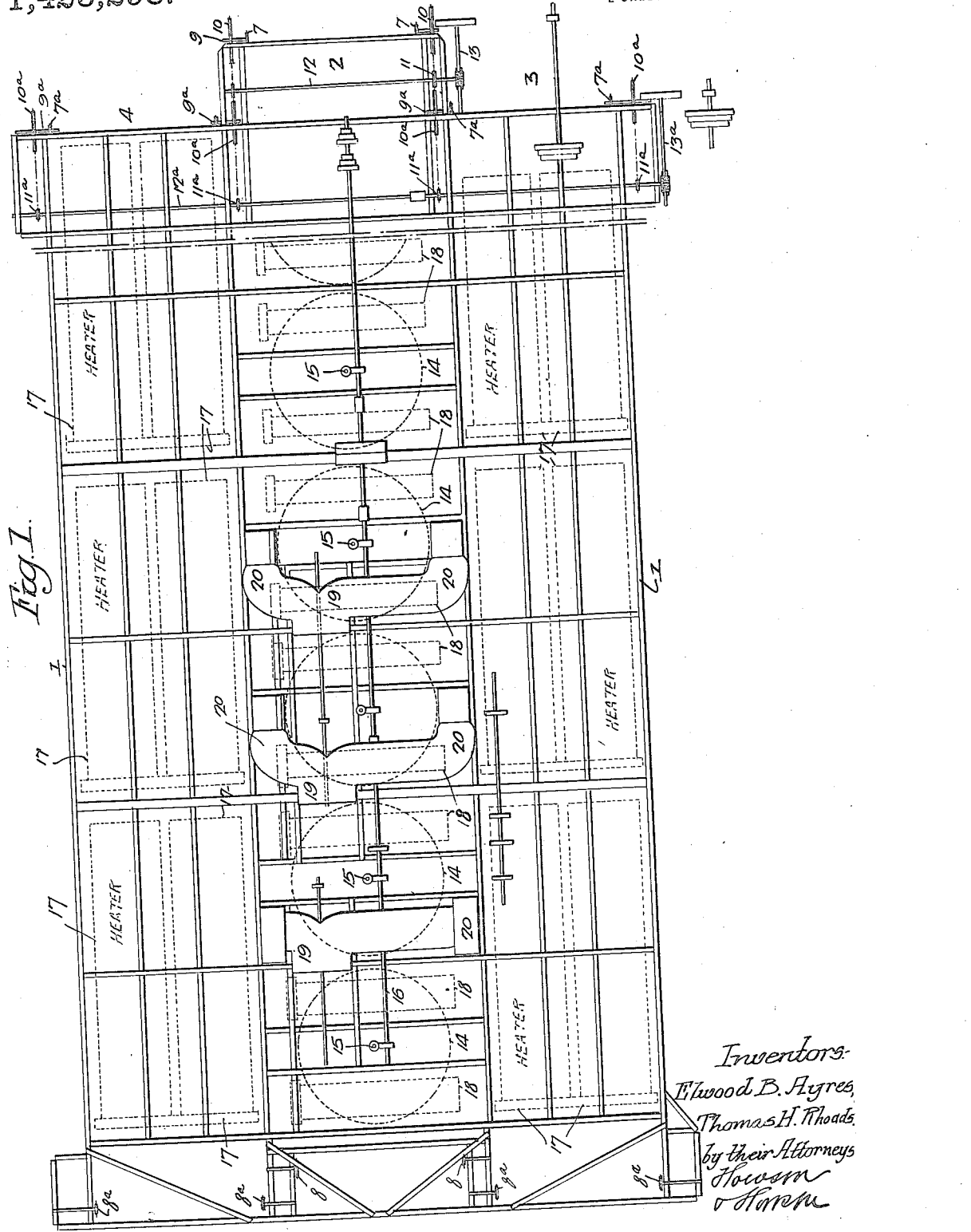
Fig. 1 is a plan view of our improved drier.
Figure 2:
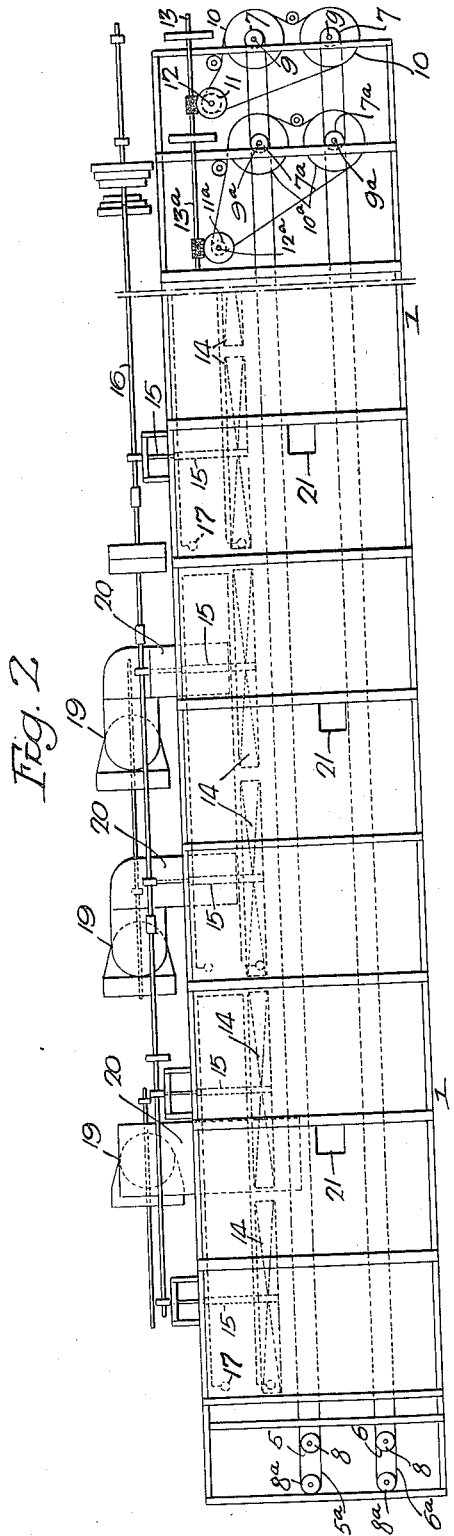
Fig. 2 is a side view.

1 is the frame of the drier, which may be made in any suitable manner. In this frame are three longitudinal drying compartments. 2 is the central compartment and 3 and 4 are the side compartments. In the central compartment, in the present instance, are two endless conveyers 5 and 6 adapted to sprocket wheels 7 and 8 at the ends of the drier. In the side compartments 3 and 4 are conveyers 5ª and 6ª adapted to sprocket wheels 7ª and 8ª. The wheels 7, 7ª are driven in any suitable manner. In the present instance, they are driven independently, as shown in Figs. 1 and 2, and the central conveyers are driven at a greater speed than the side conveyers. In some cases, in drying certain materials, all of the conveyers may be driven at the same speed.

The sprocket wheels 7 are mounted on short shafts 9 adapted to suitable bearings and on each shaft is a sprocket wheel 10 driven by a chain from a sprocket wheel 11 on a shaft 12. The shaft 12 is driven from a power shaft 13 through worm and worm gearing, shown clearly in Fig. 2.

The shafts 9ª, on which the sprocket wheels 7ª are mounted, are driven in the same manner from a power shaft 13ª, Fig. 2, and, as each power shaft is independently driven from an overhead shaft, the speed of the conveyers in the several compartments can be easily regulated.

Figure 3:
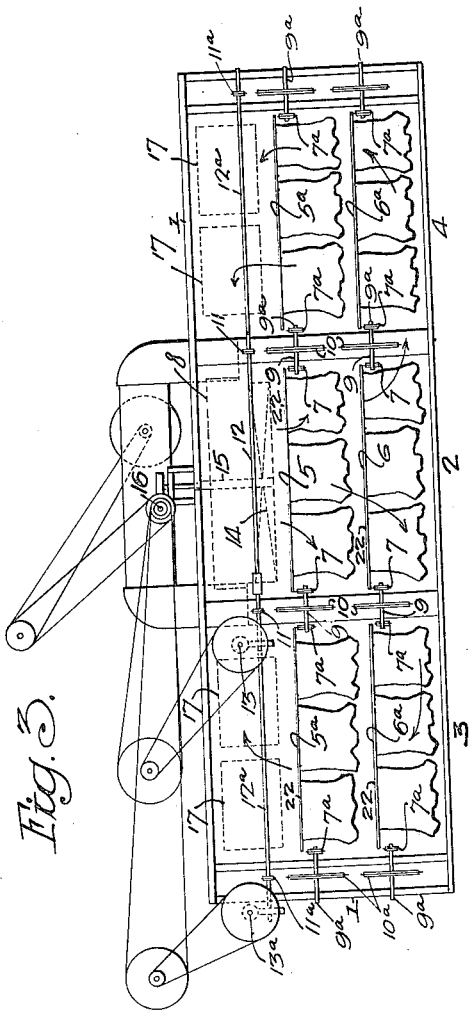
Fig. 3 is an end view.

Located in the upper portion of the central chamber 2 are a series of circulating fans 14. Each fan is mounted on a vertical shaft 15 driven from a longitudinal shaft 16. The blades of the fan are so located, and the shaft is driven in such direction, as to cause the air in circulation to be driven down through the central chamber 2 and drawn up through the side chambers 3 and 4, as shown by the arrows in Fig. 3. In the upper portion of the side chambers 3 and 4 are longitudinally arranged heating pipes 17, and, in the central chamber 2, above the fans, are a series of transversely arranged heating pipes 18, so that the entire upper portion of the drier is occupied by heating pipes, while the lower portion is utilized as drying chambers. Consequently, the capacity of the drier is materially increased over the type having heating chambers at the sides of the drying chambers.

As the skins being dried in the central chamber 2 receive the full blast of the hot air from the fans, they dry more rapidly than the skins being dried in the side chambers 3 and 4, therefore, it is preferable to convey the skins more rapidly through the central chamber than through the side chambers, as hereinbefore described.

19 are suction fans located at any suitable point. These fans connect through trunks 20 with the upper portion of the heating chamber to carry off a certain amount of moist air. The fans may be driven in any suitable manner.

21 are intake openings for supplying fresh air to the air in circulation.

In the drawings, sticks 22 are shown, which are carried by the endless conveyers 5 and 6, and the skins are hung on these sticks, but it will be understood that other well known forms of carriers may be used without departing from the essential features of the invention.

We claim:

1. The combination in a drier, of a casing enclosing three longitudinal chambers arranged side by side; a conveyer for carrying material to be dried in each chamber; a central row of circulating fans in the upper portion of the central drying chamber; and means for heating the air in circulation.

2. The combination in a drier, of a casing enclosing three longitudinal chambers arranged side by side; a conveyer for carrying material to be dried in each chamber; a central row of circulating fans in the upper portion of the central drying chamber; a series of heating pipes in the upper portion of the drier; and means for driving the fans so that the air will circulate downwards in the central chamber and upwards in the side chambers.

3. The combination in a drier, of a casing enclosing three chambers arranged side by side; means, in each chamber, for conveying material to be dried; means for circulating heated air downwards in one chamber and upwards in the other chambers; and means for driving the conveyer in the chamber in which the air is circulating downwards more rapidly than the conveyers in the other chambers.

4. The combination in a drier, of a casing enclosing three longitudinal chambers arranged side by side; two conveyers in each chamber for carrying material to be dried; independent means for driving the conveyers located in the central chamber; means for driving the conveyers in the side chambers; a series of fans located in the upper portion of the central chamber and driven so as to cause the air to circulate downwards in the central chamber; and heating means located in the upper portion of each chamber.

ELWOOD B. AYRES.
THOMAS H. RHOADS.